United States Patent
Sinha et al.

(10) Patent No.: US 8,959,511 B2
(45) Date of Patent: Feb. 17, 2015

(54) TEMPLATE VIRTUAL MACHINES

(75) Inventors: Suyash Sinha, Bellevue, WA (US); Ajith Jayamohan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 12/967,066

(22) Filed: Dec. 14, 2010

(65) Prior Publication Data

US 2012/0151477 A1      Jun. 14, 2012

(51) Int. Cl.
  *G06F 9/455*      (2006.01)

(52) U.S. Cl.
  CPC .. *G06F 9/45558* (2013.01); *G06F 2009/45562* (2013.01)
  USPC ........................................................... 718/1

(58) Field of Classification Search
  None
  See application file for complete search history.

(56) References Cited

U.S. PATENT DOCUMENTS

| | | | |
|---|---|---|---|
| 7,210,147 B1 | 4/2007 | Hipp et al. | |
| 2007/0234302 A1* | 10/2007 | Suzuki et al. | 717/126 |
| 2009/0249335 A1* | 10/2009 | Vasilevsky et al. | 718/1 |
| 2009/0282404 A1* | 11/2009 | Khandekar et al. | 718/1 |
| 2009/0300151 A1* | 12/2009 | Friedman et al. | 709/222 |
| 2009/0316721 A1 | 12/2009 | Kanda | |
| 2009/0328030 A1* | 12/2009 | Fries | 717/174 |
| 2010/0042994 A1* | 2/2010 | Vasilevsky et al. | 718/1 |
| 2011/0225342 A1* | 9/2011 | Sharma et al. | 711/6 |
| 2011/0276543 A1* | 11/2011 | Matze | 707/692 |
| 2012/0047313 A1* | 2/2012 | Sinha et al. | 711/6 |
| 2012/0084775 A1* | 4/2012 | Lotlikar et al. | 718/1 |
| 2012/0110574 A1* | 5/2012 | Kumar | 718/1 |
| 2012/0265959 A1* | 10/2012 | Le et al. | 711/162 |

OTHER PUBLICATIONS

MicroSoft TechNet—Sysprep Technical Reference—Published Oct. 22, 2009, All pages: http://technet.microsoft.com/en-us/library/dd744263(v=WS.10).aspx.*
Simplifying Service Deployment with Virtual Appliances Changhua Sun, Le He, Qingbo Wang and Ruth Willenborg Published: 2008.*
Creating Differencing Disks with Microsoft Virtual PC Daniel Petri Published: Jan. 8, 2009.*
Memory Resource Management in VMware ESX Server Carl A. Waldspurger Published: 2002.*
Scalability, Fidelity, and Containment in the Potemkin Virtual Honeyfarm Michael Vrable, Justin Ma, Jay Chen, David Moore, Erik Vandekieft Published: 2005.*

(Continued)

*Primary Examiner* — Emerson Puente
*Assistant Examiner* — Paul Mills
(74) *Attorney, Agent, or Firm* — Steve Wight; David Andrews; Micky Minhas

(57) ABSTRACT

There is provided a method of providing a template virtual machine. An exemplary method comprises creating a template virtual machine comprising an image of an operating system and software running on the operating system. The template virtual machine does not include machine-specific identifiers. The template virtual machine is booted into a virtual machine environment. Subsequently, machine-specific identifiers for the template virtual machine are updated. The template virtual machine may then be booted with machine-specific identifiers into a service instance to perform a function determined by the software running on the operating system such that uniform code pages representing the operating system and software running on the operating system are shared among virtual machines in the virtual machine environment.

21 Claims, 7 Drawing Sheets

(56) References Cited

OTHER PUBLICATIONS

"VMware VSphere: Taking Virtualization to the Next Level", Retrieved at << http://www.computeruser.com/articles/vmware-vsphere-taking-virtualization-to-the-next-level.html >>, Oct. 27, 2009, pp. 9.

Chris, "Archive for Category Desktop Virtualization", Retrieved at << http://www.chriswolf.com/?cat=9&paged=2 >>, Sep. 3, 2009, pp. 18.

Larson, et al., "Chapter 2: Hyper-V Overview", Retrieved at << http://www.virtualizationadmin.com/articles-tutorials/general-virtualization-articles/chapter-2-hyper-v-overview.html >>, Aug. 19, 2009, pp. 42.

Wood, et al., "Memory Buddies: Exploiting Page Sharing for Smart Co-location in Virtualized Data Centers", Retrieved at << http://lass.cs.umass.edu/papers/pdf/VEE09-membuds.pdf >>, ACM SIGPLAN/SIGOPS International Conference on Virtual Execution Environments (co-located with ASPLOS), Mar. 11-13, 2009, pp. 10.

"Server Consolidation and Containment", Retrieved at << http://www.vmware.com/pdf/server_consolidation.pdf >>, pp. 3.

"VMWare Solutions—Virtualization Services", Retrieved at << http://www.systecinc.com/vmware.php >>, Retrieved Date: Sep. 8, 2010, pp. 3.

* cited by examiner

100

200

400

TEMPLATE VIRTUAL MACHINES

BACKGROUND

Cloud computing is becoming an increasingly important aspect of the Internet. In cloud computing, resources (for example, servers or desktop computers) and applications are virtualized on the Internet and packaged for sale to customers. Cloud computing is attractive to potential customers because it allows them to purchase needed computing services without incurring high up-front costs. Examples of cloud computing product offerings include infrastructure as a service (IAAS), platform as a service (PAAS) and software as a service (SAAS).

In a large number of cloud computing workloads, the servers are under-utilized in terms of CPU utilization. Virtual machines (VMs) have been used to increase consolidation ratios on servers thereby reducing the total cost of ownership (TCO) for infrastructure providers. Consolidation ratios increase as more instances of virtual hardware are able to be implemented on a single physical machine.

As consolidation ratios increase, the amount of physical memory available in the machine starts becoming a bottleneck. One technique to address this problem is known as memory overprovisioning. In memory overprovisioning, information that is used by multiple virtual machines is shared in physical memory. Memory overprovisioning allows an increase in consolidation ratios while keeping the physical memory requirements lower than would be possible if all memory was partitioned across virtual machines.

A specific example of a memory overprovisioning technique is known as page sharing. Page sharing provides for the opportunistic sharing of memory pages that have the same content across virtual machines. However, page sharing techniques consume system resources (overhead) in determining whether memory pages may be shared. The system resources used to dynamically monitor page sharing operations are essentially not available to do useful work for virtual machines.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method and a system for providing a template virtual machine. In an exemplary method, a template virtual machine is created. The template virtual machine includes an image of an operating system and one or more software applications running on the operating system. Initially, no machine-specific identifiers such as a System Security Identifier (SID) are provided for the template virtual machine. The template virtual machine is booted into a virtual machine environment. Subsequently, machine-specific identifiers are updated for the template virtual machine. Attributes corresponding to the machine-specific identifiers may be maintained in a state separated store on a differencing virtual hard disk. The template virtual machine with machine-specific identifiers may be booted into a service instance to perform a function determined by the software running on the operating system. Uniform code pages representing the operating system and software running on the operating system may then be shared among virtual machines in the virtual machine environment. Consolidation ratios in the virtual machine environment may be improved by sharing uniform pages corresponding to the operating system and the software running on the operating system among multiple template virtual machines.

An exemplary system for providing a template virtual machine according to the subject innovation includes a processing unit and a system memory. The system memory may comprise one or more computer-readable storage media. The system memory stores code configured to direct the processing unit to create a template virtual machine comprising an image of an operating system and software running on the operating system. The template virtual machine is initially created without machine-specific identifiers. The system memory also stores code that directs the processing unit to boot the template virtual machine into a virtual machine environment. Machine-specific identifiers are added to the template virtual machine after it is initially booted into the virtual machine environment. With the machine-specific identifiers present, the template virtual machine may be booted into a service instance to perform a function determined by the software running on the operating system. Uniform code pages representing the operating system and software running on the operating system may then be shared among virtual machines in the virtual machine environment.

Another exemplary embodiment of the subject innovation provides one or more computer-readable storage media. The computer-readable storage media store computer-readable code configured to direct a processing unit to create a template virtual machine comprising an image of an operating system and software running on the operating system. The template virtual machine, when initially created, does not include machine-specific identifiers. Code is stored on the computer-readable storage media to boot the template virtual machine into a virtual machine environment. Also stored on the computer-readable storage media is code to apply machine-specific identifiers to the template virtual machine. The template virtual machine with machine-specific identifiers may be booted into a service instance to perform a function determined by the software running on the operating system. According to the subject innovation, uniform code pages, each representing portions of the operating system and software running on the operating system, may then be shared among virtual machines in the virtual machine environment.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
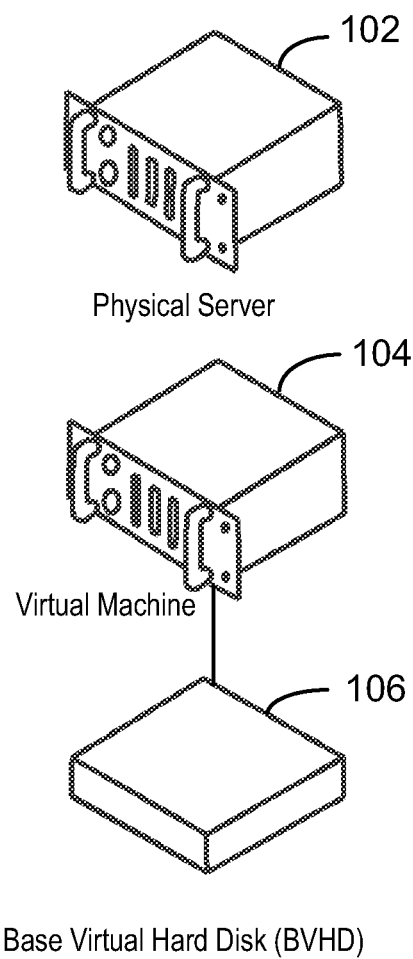
FIG. 1 is a block diagram of a virtual machine system.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "server," "cloud," "virtual machine" and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media, such as a computer-readable storage media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for electrical or electronic signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation uses template virtual machines to provide an increase in consolidation ratios in a large number of homogeneous workload deployments. An exemplary embodiment provides efficiency by not consuming additional CPU resources for opportunistically sharing uniform memory pages.

An exemplary embodiment employs template virtual machines to improve consolidation ratios in homogeneous workload deployments. A homogeneous workload deployment includes a relatively large number of virtual machines running the same software stack. The virtual machines in a homogeneous workload deployment typically provide a common service.

One example of a homogeneous workload deployment is a web-server farm. In such an example, there is a priori knowledge that each web server virtual machine executes a particular operating system, a particular runtime, and particular web-server software (such as Internet Information Services (IIS)). The application running on top of the web server may also have multiple replicas running in the server farm. The uniform code pages of all these homogeneous software entities can be shared a priori (i.e., in advance and not opportunistically or dynamically). Because many attributes shared by virtual machines are known in advance, resources relating to those common attributes may be shared without dynamically consuming system resources to determine whether opportunistic sharing is possible. In addition, each instance has a specific configuration related to the operating system and applications. In an exemplary embodiment, the uniform code pages are represented as identical pages of physical memory.

FIG. 1 is a block diagram of a virtual machine system 100. The virtual machine system 100 includes a physical server 102. A virtual machine 104 is created on the physical server 102. The virtual machine 104 is associated with a base virtual hard disk (BVHD) 106, which provides storage.

An OS may then be installed on the virtual machine 104. Any suitable OS may be installed, for example, the Windows Server®2008 R2 operating system. After installation of the OS on the virtual machine 104, one or more relevant applications for a specific server role may be installed. Examples of roles that may be supported by applications in a homogeneous workload deployment include the roles of web server, email server, identity federation server, or the like. At this point, the applications are not customized for specific functionality.

After application installation, a state separated store service may be installed to intercept configuration states and to redirect to a store on the next boot. A system preparation process may then be run on the virtual machine 104 to create a generalized version of the OS configuration. An example of a system preparation process in a Windows® environment is the Windows® Automated Install Kit/SYSPREP system preparation program.

After system preparation is performed, the virtual machine 104 may be shut down. At this point, the virtual machine 104 may be thought of as a "clone" that has not yet been customized for specific datacenter deployment or customized to run on activation.

Figure 2:
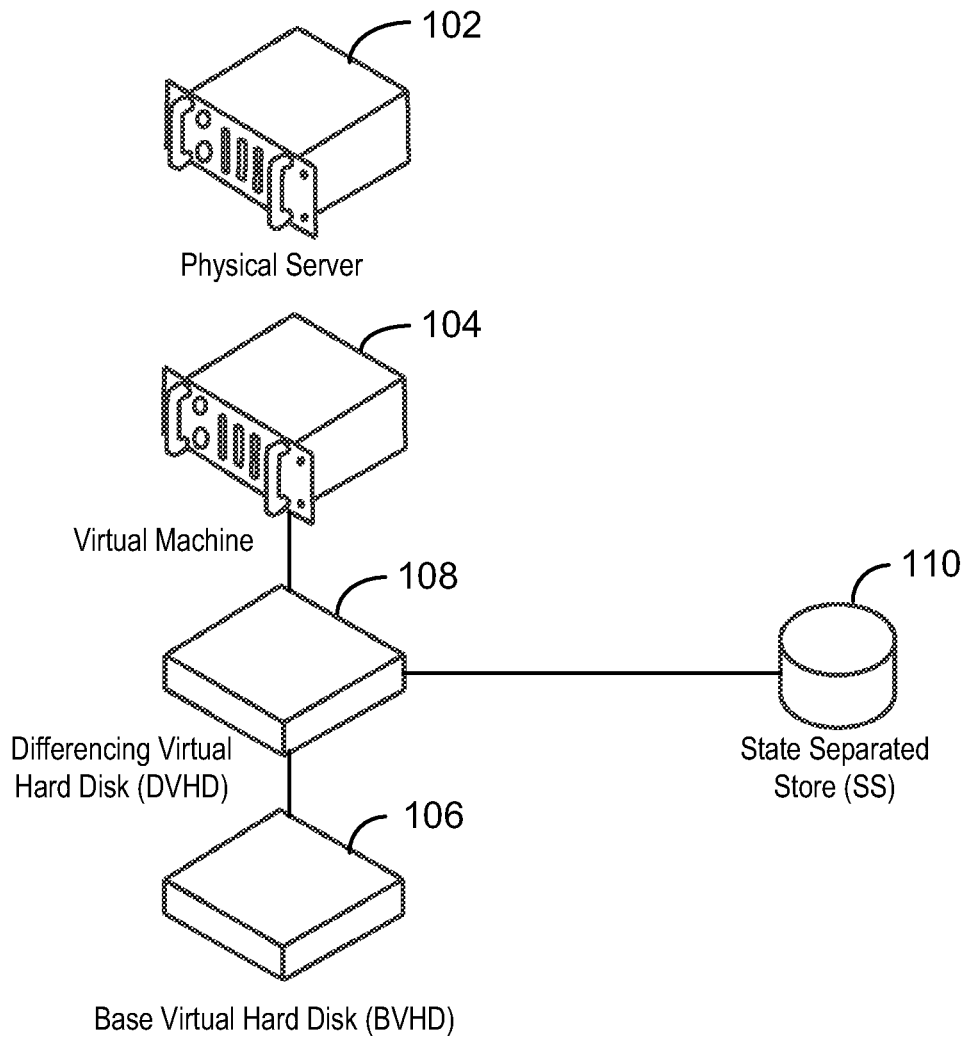
FIG. 2 is a block diagram of a system in which a template virtual machine according to the subject innovation may be created.

FIG. 2 is a block diagram of a system 200 in which a template virtual machine according to the subject innovation may be created. Before booting the clone virtual machine described with reference to FIG. 1, a differencing virtual hard disk (DVHD) 108 is created so that future changes to disk are targeted to it instead of base virtual hard disk 106. The virtual machine 104 is then booted. OS and application customization may then be run to provide a fully configured virtual machine that is ready for deployment, for example, into a homogeneous workload deployment. A state of the virtual machine 104 may be "generalized" in a state-separated store 110 associated with the differencing virtual hard disk 108. The state separated store 110 preserves the state of the virtual machine 104 so that it may be replicated.

The virtual machine 104 may be finalized into a template virtual machine using either a snapshot approach to capture the state of the virtual machine or by using an offline/restart approach. In the snapshot model, operation of the virtual machine 104 is suspended, and its memory state is saved. A virtual processor configured to run the virtual machine 104 is primed to restart in special code to complete generalize/load custom configuration from the state separated store 110. The contents are then saved. In the offline/restart model, the server role and the virtual machine itself are both shut down. After shutdown, the user-defined configurations and OS-specific configurations are available in the state separated store 110. Under either method, a template virtual machine according to the subject innovation is represented in the state separated store 110.

In an exemplary embodiment, the a priori knowledge of shared resources in a homogeneous workload deployment may be used to create pre-booted template virtual machines as described herein. The template virtual machines may be remapped into multiple virtual machines on a server leading to all virtual machines in the physical server running code from the same set of physical pages. In this manner, consolidation ratios in a homogeneous workload deployment may be improved.

Figure 3:
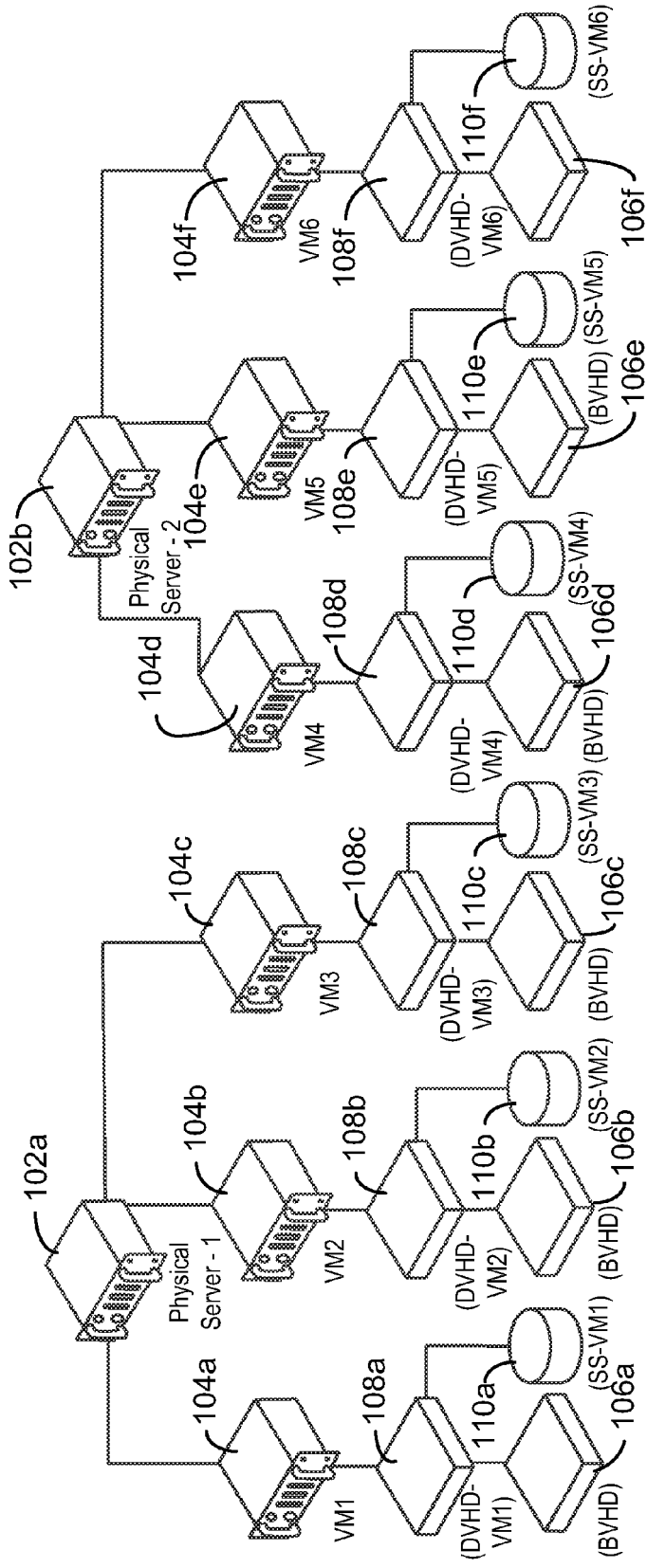
FIG. 3 is a block diagram of a homogeneous workload deployment in which several template virtual machines according to the subject innovation are deployed.

FIG. 3 is a block diagram of a homogeneous workload deployment 300 in which several template virtual machines according to the subject innovation are deployed. In particular, three template virtual machines are deployed for each physical server shown in the homogeneous workload deployment 300. In FIG. 3, the various components of the homogeneous workload deployment are labeled with the same base reference number corresponding to that component in FIGS. 1 and 2. Each instance of the component shown in FIG. 3 is appended with a letter (a-f).

According to the subject innovation, all of the base virtual hard disks 108a-f remains the same across all configurations. Individual differencing virtual hard disks 110a-f are created/copied across to the physical server before the corresponding one of the template virtual machines 104a-f is activated. As each of the template virtual machines 104a-f starts up and starts the specific functional role for which it is prepared, it receives a state separated store 110a-f, which may take the form of a hive. The state separated stores 110a-f may be used to create differentiation in terms of machine name, server SID, network configuration and so on.

Preparation of the new configuration can be accomplished online as part of activation or offline through direct modification of one of the state separated stores 110a-f. The latter case is shown in FIG. 3, whereas altered store is directly deployed to the physical machine. When the virtual machine starts up with this model, additional virtual machines may be started on the same physical server (virtual machines 104a-c on the physical server 102a and virtual machines 104d-f on the physical server 102b). In this manner, the a priori knowledge that code pages corresponding to the OS and deployed applications (before customization) are identical may be exploited by running the same physical pages for all of the virtual machines deployed on one of the physical servers.

As explained herein, pre-booted snapshots of service-specific virtual machine templates according to the subject innovation may be further booted into specific service instances. Machine-specific identifier creation and/or updating may be deferred further in the operating system boot process so that it is done after the creation of the template virtual machine. As used herein with respect to machine-specific identifiers, the term "update" refers to adding, changing or deleting machine-specific identifiers of a template virtual machine.

A priori sharing of uniform code pages among virtual machines that are running the same template (one per service type) may be provided. Also, an exemplary embodiment of the subject innovation may provide a priori sharing of configuration information, where possible, among virtual machines that are running the same service type. Unique system and application state information may be separated to a state separated store kept in a differencing virtual hard drive. Offline manipulation of the differencing virtual hard drive may be performed to create cloned virtual machines (templates) that provide customization and retain machine-specific properties of systems that are desirably maintained as unique (for example, System GUID).

System and application software that is part of the operating system or run on the operating system store information, either created as part of specific execution or derived from prior information on the disk. They access this permanent, persisted information across boots or application activations. Typically, the information is stored as a file on disk or as a set of keys in the system or user registry. Such information is often referred to herein as "software state" and can contain configuration information, application services, defined data or runtime information that the software persists for later retrieval.

According to the subject innovation, a template virtual machine identifies this software state and provides offline manipulation of such state so that when the pre-booted VM templates are started, they each have their own configuration, including unique system names, network configuration information and application specific unique states. The state separated store 110 may be used as part of template virtual machines that use this store to create, manipulate and instantiate such template virtual machines from the differencing virtual hard drive 108.

Template virtual machines may be created by creating template images of the operating system, and the other software running on top of it. This image may then be booted in a virtual machine environment to a point before machine-specific identifiers are created so that the image is fully generic, hence, a template. In many cases, operating system creates some kind of identifier to distinguish itself from other machines. Some operating systems employ a GUID for this purpose. The creation of these identifiers is either deferred, or stripped out (as in sysprep), in building virtual machine templates so that the template is truly generic. Large memory pages can be used to further optimize the amount of mapping information needed for the code running in the template virtual machines. In order to separate the derived state or any software state created as part of laying out the operating system, its services, other system critical processes and the application itself, the state separated store 110 held in a separate differencing virtual hard drive may be used. In this manner, the template images are kept generic while still providing the capability to customize the images from the perspective of operating system, services and application itself.

Pre-booted virtual machine templates may be snapshotted as described herein using typical virtual machine snapshot mechanisms which are provided by strong virtualization infrastructure. The snapshot is preserved in high-speed, distributed high-availability storage (for example, a SAN) for later use.

Template virtual machines may be used to add service instances to accommodate additional workload in a data center. Prior to deploying the first service instance, the differencing virtual hard drive 108 can be opened for offline manipulation without booting the template. It is possible to open the state separated store 110 offline and securely access states within this store in the differencing virtual hard drive 108. This provides greater ease of use for customizing each instance prior to deployment. If the operating system already provides clear state separation, the template virtual machine process can be accomplished without the state separated store proposal described herein.

In an exemplary embodiment, a first service instance of a virtual machine is created by copying the image into the system memory, creating guest physical address mappings to it, and starting execution (booting) by the virtual processors from the point the template was snapshotted. Machine-specific identifiers may be created at this point within the instance. In addition, the service-specific data-set may be made available to the service instance through the newly modified state store accessible to the virtual machine. At this point, the new service instance is ready to serve client requests.

When the workload needs a new instance of the service to accommodate additional capacity after the first one is already running, a new virtual machine is created and its guest physical address space is pre-mapped to the uniform system pages that already have the code pages resident. This implies that the uniform code pages are shared a priori.

State Separated Store Concepts

The following discussion relates to state separated store concepts and how the state separated store may be integrated with a template virtual machine scenario. The state separated store 110 provides a generic way to register a schema for the store that contains one or more state containers.

Store Scope

In an exemplary embodiment, the state separated store 110 is scoped. The scope may be identified by a string type notation and may allow the software state (with a specific key, value pair) to exist within that scope. In an exemplary embodiment, scopes are not to be nested and they provide a parallel environment for {key, value} pairs to exist without any collision. The scope is specified as part of the registration of the store schema when a store is registered with the system. In an exemplary embodiment, the scope is unique because it identifies a specific virtual machine.

The store scope may be considered as a "namespace" within a store. It allows multiple components to use the same store in a shared way without interfering with the settings and values of other components. By way of example, the scope for drivers could be a "Drivers" namespace from the root. Thus, an entry created by a Driver Foo like "\FooDriver\Configuration" may be stored in the scoped store as "\Drivers\FooDriver\Configuration" in the state container. As an example, if the operating system services and tasks used the same state separated store for storing its configuration settings, the scope can be used as an effective parallel namespace to allow the task Foo to have different settings that do not interfere with service Foo. Moreover, the settings could be stored in the state container as "\Service\Foo\Settings" and "\Task\Foo\Settings" respectively.

Store Identifier

The state separated store 110 may have a string based identifier that allows the store to be registered with the system with a friendly name. This allows the store registration, its schema and scope in addition to the physical location of the private hives or application hives (app hives) backing the store to be persisted in the system.

The term "private hive" refers to the backend store (a file) in the system that is available only through specific root paths. That is, access to the store is available for one or more applications if they know the root path where the store is hosted.

In contrast, "Application Hives" are tied to a specific application. Access is controlled to that application only and only information private to that application is stored there.

The state separated store 110 can be thought of as a "private hive" store for all applications so that global configuration data is captured there from the system perspective. It is also possible to architect it as an application hive so that multiple such store backends exist for each application. For example, for a SQL Server® database application configuration, there could be a separate "sqlstore." In addition, IIS could have a separate "IISStore." All the OS and global configuration could go to a default store like a private hive based "GlobalStore."

State Container

In an exemplary embodiment, state containers can be considered as a partition that holds a software state (for example, of a template virtual machine). Each state maintained in the container may contain a "Name, Value" pair relationship. The "Name" can be hierarchical (analogous to registry paths) and provides headroom for clients to segregate their state into useful classifications. An exemplary state container contains some properties that define the attributes/properties of the state container. The following sections relate to examples of attributes/properties of an exemplary state container. Those examples include an identifier attribute, a security attribute, a container type attribute and a precedence rank attribute.

Identifier

The Software Container Identifier is a string identifier that allows the clients to specify a direct state container for read, write access operations. This may be an optional attribute. If it is not specified, the client will not be able to target that container for direct access/modifications. If the Identifier is specified, it is desirably unique for the specified store schema. In an exemplary embodiment, registration of the store will fail if the identifier is not unique.

Security

In an exemplary embodiment, each state container provides security control. During store registration, the schema will provide the required read and write access privileges needed to access the state container. Clients attempting to access the state container directly by specifying the state container identifier may be subject to the access checks before they can read or write to the container. If the client accesses the store through the store handle (default access pattern), the store is accessed through the precedence rules that will be explained later.

Container Type

An exemplary embodiment includes two types of state containers. These two types are the default write type and the override type. If a state container is marked as 'default write', that container is used as the target for write operations performed on the store. In an exemplary embodiment, the store schema contains only one default write container. If a default write container is not specified, the highest ranked non-override container is assumed to be the 'default write' container.

An override state container allows the store designer to dictate how write accesses to the containers can be enforced through the precedence rank. A state container marked as 'override' will not allow write operation to containers with lower precedence rank than its own. Any such write operation will fail with a suitable error code that sufficient privilege is not held for that operation.

Precedence Rank

In an exemplary embodiment, the precedence rank controls how the store schema can be composed in layers and creates the state separation model by allowing multiple state containers to layer together to provide options to create state separated layout that provides the notion of policy override, user settings and default settings, etc. The precedence rank may be a number starting from 1 to N where N in the number of state containers that are to be layered in some order. There can be only one state container at a specific precedence rank. The precedence rank number 0 may be reserved and for system use only.

The access to the store may occur according to the following model. If a settings value exists in the state container at the N precedence rank, that value is returned. If not, the process is repeated by querying each state container at a lower precedence rank. In an exemplary embodiment, the writes are performed at the 'Default Write' state container.

Physical Storage for State Container

In an exemplary embodiment of the subject innovation, two options are available for specifying the physical storage location for a state container. Those physical storage options are an app hive and a private hive. An optional symbolic link to a path within a private hive may also be provided.

The app hive is one of the options for the physical backing storage for the state separated store 110. The app hive may provide several convenient abstractions and features that allow the state separated store to be designed on top of it. Compared to the private hives, the app hives provide more isolation and also mitigate information disclosure to clients who might circumvent the store access model to directly read from the registry.

App hives have some characteristics that fit well with the state separated store model. One such characteristic is the ability to load the hive without requiring SE_RESTORE or SE_BACKUP privileges. Moreover, only processes that load the hive can have access to it. No system wide visibility of the hives that are loaded is needed. A second characteristic is that app hives provide a single security descriptor (SD) that is applicable to the entire hive. This allows each state container to map its security settings directly on top of the app hive and let access checks be carried out by the registry to allow or disallow access to specific state containers.

Typically, each state container is hosted on a separate app hive. This allows easy servicing and management of state during upgrade and migration scenarios.

A private hive could also be used and customized to suite the requirements of the state separated store model. Since private hives are publicly visible, they need to be locked down with appropriate priority to allow only accesses through the API surface and prevent direct access modifications unless LocalSystem privileges are used. It is also possible to specify an additional path inside the private hive and set up a symbolic link to the root of the state container. This allows multiple state containers to share the same physical hive while keeping their paths/namespace separate.

Store Registration and Schema

In an exemplary embodiment, a state separated store is registered with the system before it is opened for use. The registration operation requires the store schema to be specified as an array of state container descriptors. Each descriptor identifies the characteristics of the state containers that are part of the store and provide details about its rank, security privilege to access the container, its optional type and an identifier. It also specifies how the container is laid out in disk, either as an app hive or private hive or a symbolic link within a specific private hive.

Figure 4:
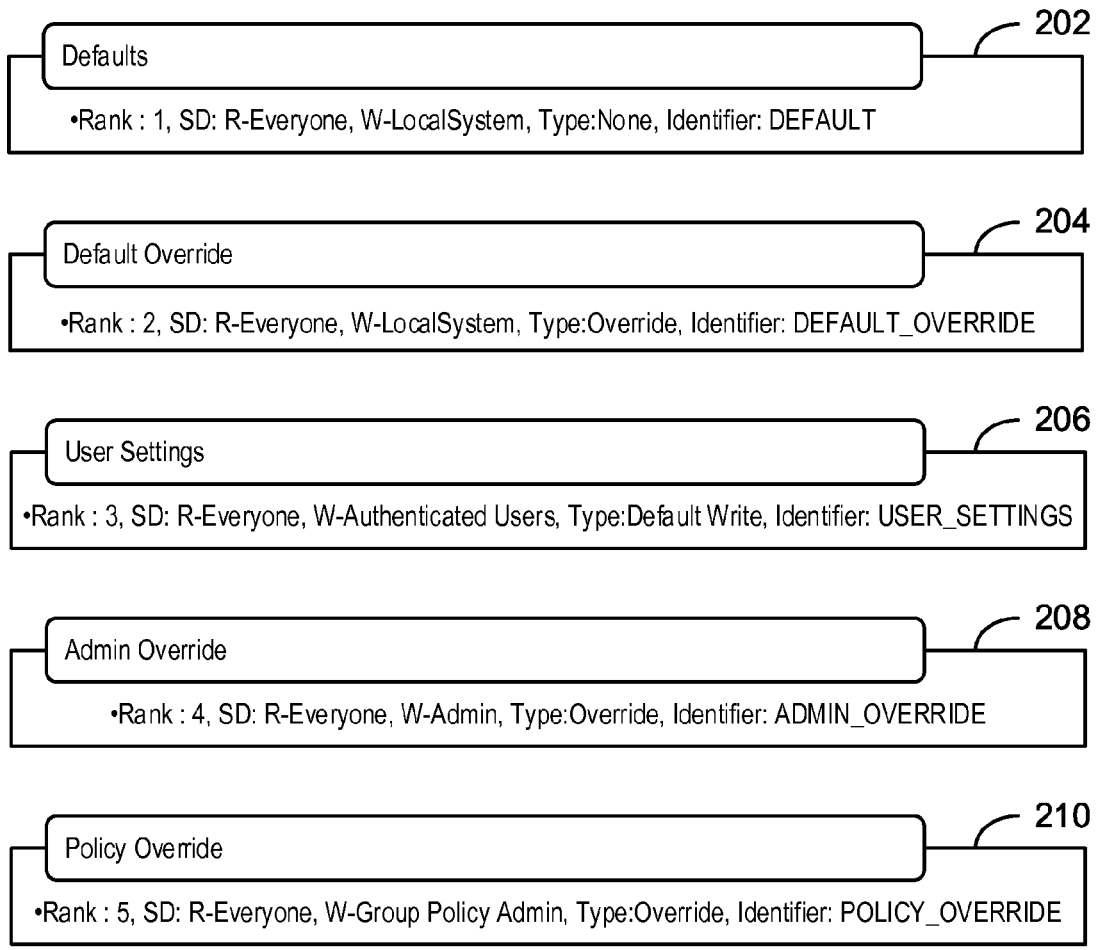
FIG. 4 is diagram showing a store schema with a store identifier and a store scope according to an exemplary embodiment of the subject innovation.

FIG. 4 is diagram showing a store schema 201 with a store identifier and a store scope according to an exemplary embodiment of the subject innovation. The store schema 201 represents a state separated store that contains five state containers. The state containers include a defaults container 202, a default override container 204, a user settings container 206, an admin override container 208 and a policy override container 210. The store schema 201 shown in FIG. 4 is useful in explaining a sample store registration that uses the state container descriptors to register itself.

Each of the containers shown in FIG. 4 have a rank, security attributes (read=R, write=W), type and identifier. The rank, security attributes, type and identifier for each of the containers shown in FIG. 4 are for purposes of example only. Each state container has its own unique identifier and is mapped to a unique hive with that identifier. It is possible to specify an additional symbolic link within a private hive to act as the root node for that state container. In such cases, one or more state containers can share a private hive while maintaining distinct isolation due to different symbolic link paths.

An example of the use of precedence rank in the state separated store 110 is useful for showing how it ties to multiple tenants hosted in a virtual machine environment. Consider a tenant that is provisioned for a virtual machine using the template virtual machine approach described herein. As part of configuration, the tenant can update its associated state separated store in such a way that it exposes certain network ports outside the firewall.

The tenants update operation on the global store will be written to the default override container 204. If the tenant had admin privileges on the virtual machine and writes these settings, it will be written to the admin override container 208. If a cloud provider who has control of group policy does not want to open ports, the policy override container 210 may be updated such that firewalls are enforced even on the ports that were attempted to be open by a malicious or misbehaved tenant code.

Template VM with State Separated Store.

Creating a Template VM

In an exemplary embodiment, an OS image is installed with one of more applications installed on this image to perform a specific role or service. During the early initialization phase of the OS (first boot), the state separated store is instantiated. It actively intercepts system access to various configuration data stored in the registry and creates the view with multiple state containers as outlined herein.

The same process may apply as applications are installed and specific derived states are created in the process. At the end of the process, the template VM will result in a template virtual hard disk and state virtual hard disk, which is a differenced virtual hard disk where all derived/modified state information is located.

Preparing the Template VM

Through offline inspection of the state virtual hard disk, the preparation process can read and mark the contents of the state that are deemed unique and require re-initialization. This process prepares the template VM for large-scale homogenous deployment in environments such as a datacenter.

Staging the Template VM

Prior to actual execution of the template VM, the state virtual hard disk is updated, again through offline modification to instantiate new state for all system and application states deemed as 'unique' in the preparation process. This includes re-initializing unique system settings like system GUID, and modification of the local machine SID to eliminate duplicates in the network and such. In terms of application settings such as data locations that an application is serving out in that instance can also be modified as part of the staging process.

Starting the Template VM

Once the staging process is complete, the state virtual hard disk is closed and the memory contents of the template VM are restored to the target system. The virtual machine is resumed from the suspended state upon which it uses the new system and application state to run the role for which it was provisioned.

Implementation of a State Separated Store API

According to an exemplary embodiment, the store registration operation registers the store schema with the system and allows subsequent open, read/write access and close operations on that store. Table 1 below sets forth exemplary operations, along with explanations:

TABLE 1

| Operation | Explanation |
| --- | --- |
| Register state store | Registers a state separated store with the system. This call validates the schema of the store presented as an array of state container descriptors and prepares the store for future access. The caller must have access rights to register the store. The caller also specifies a friendly name or identifier to the store that is used during subsequent open operations. |
| Unregister state store | Unregisters a previously registered state store. This operation can fail if the store is currently open with any open handles. After the unregister operation, store is no longer available for subsequent open calls but the app hives backing the store is left untouched. |

Store Open/Close Operations

In an exemplary embodiment, open and close operations of the store are provided. The open operation can be used to open an instance handle to the store or an instance handle to specific store container associated with the store. The store is identified by a "store identifier" or friendly name that is provided as part of store registration. This store identifier is used in the open operation to obtain an instance handle to the store.

If the store operation specifies a store container identifier, then access checks are performed on the caller to validate if the caller has access rights to obtain an instance handle to the state container. The following Table 2 sets forth exemplary open and close operations, along with explanations.

TABLE 2

| Operation | Explanation |
| --- | --- |
| Open State Store Handle Open State container Handle | Open an instance handle to either a state store or to a state container within a specified state store. The caller must have access rights to open an instance handle against the state container. The store is specified using a friendly name or "store identifier". The state container can be specified using the "state container identifier". Both a simple strings that identify the store that the caller is attempting to open. If such a store or state container doesn't exist or not registered, an error is returned. |
| Close State Store Handle Close State container Handle | Closes an instance handle for a previously opened state store or state container. All pending operations are flushed to the store or container as the close operation is completed. |

Table 3 sets forth some exemplary store access operations and associated explanations.

TABLE 3

| Operation | Explanation |
| --- | --- |
| Read Settings Value | Read a specific settings value from the open store handle or state container handle.<br>If a store instance handle is provided, the setting is read based on effective value computation. The effective value is computed simply by checking settings value is present on the highest ranked state container and walking down to each container with a lower rank. |
| Write Settings Value | Writes a specific settings value to the open store handle to state container handle.<br>If the store handle is used, the write operation is targeted to the state container marked as 'default write'. If the setting value is set on one of the override containers with higher rank than the 'default write' state container, the write operation will fail.<br>If a state container is used, the write operation is targeted at a specific state container and no checks are performed. |
| Delete Settings Value | Deletes the specific settings value from the store or state container.<br>If a store handle is used, the delete operation is targeted at the state container marked as 'default write'. If the settings value is set on one of the override containers with higher rank than the 'default write' state container, the delete operation will fail.<br>If a state container handle is used, the key is deleted from the container. |

Store Cache Model

The State separated store may internally maintain a system state container as part of each store registered in the system. It may use a system state container as a cache to store the effective value computed for each setting under a specific key. This allows quicker access to effective values of frequently read settings without requiring up to N accesses (where N is the number of accesses in the state separated store) to the different keys within each state container to read the effective value. The cached value can be easily invalidated and kept as volatile to prevent stale data from being returned to the caller.

Figure 5:
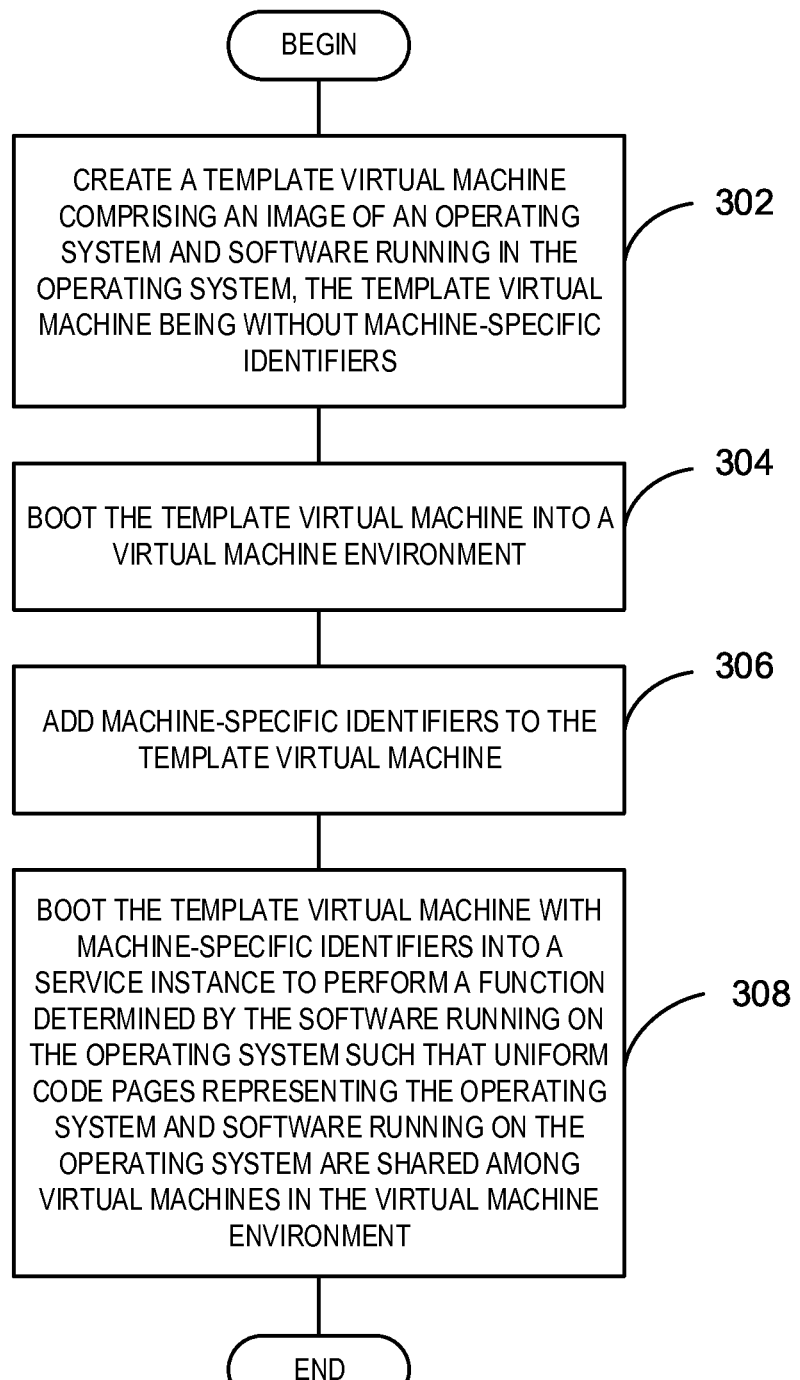
FIG. 5 is a process flow diagram of a method for providing a template virtual machine according to an exemplary embodiment of the subject innovation.

FIG. 5 is a process flow diagram of a method 301 for providing a template virtual machine according to an exemplary embodiment of the subject innovation. At block 302, a template virtual machine is created. As described herein, the template virtual machine comprises an image of an operating system and software running on the operating system. The software defines a service to be provided by the template virtual machine. At this point, the template virtual machine has no machine-specific identifiers.

At block 304, the template virtual machine is booted into a machine environment. Machine-specific identifiers such as a GUID are added to the template virtual machine, as shown at block 306. At block 308, the template virtual machine may be further booted into a service instance corresponding to the software being executed. In this manner, consolidation ratios in the virtual machine environment may be increased through the a priori sharing of uniform code pages corresponding to the operating system and the software running thereon. Moreover, one or more of the uniform code pages may store elements related to both operating system code and application code. In this manner, the known functionality of a homogeneous workload deployment may be exploited to allow more efficient sharing of code pages among virtual machines.

As set forth herein, attributes corresponding to machine-specific identifiers and application state information may be stored in a state separated store. The state separated store may be maintained on a differencing virtual hard disk.

In order to provide additional context for implementing various aspects of the claimed subject matter, FIGS. 4-5 and the following discussion are intended to provide a brief, general description of a suitable computing environment in which the various aspects of the subject innovation may be implemented. For example, behavioral and contextual notifications, as described in the previous figure, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Figure 6:
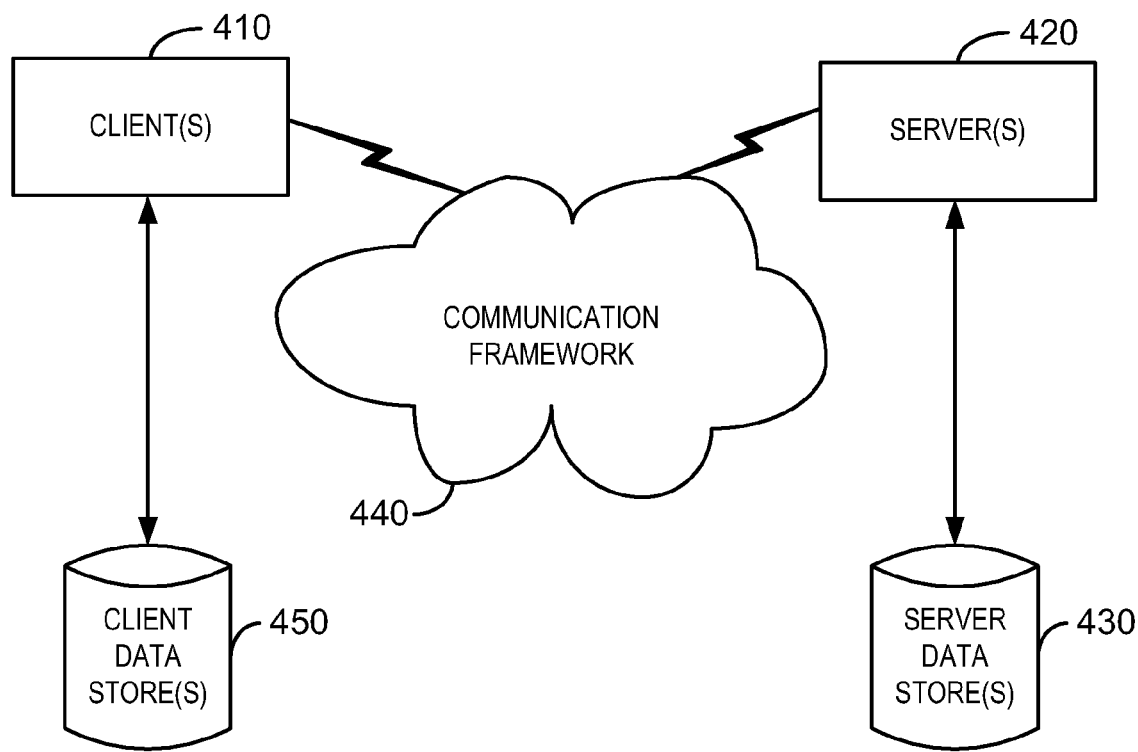
FIG. 6 is a block diagram of an exemplary networking environment wherein aspects of the claimed subject matter can be employed.

FIG. 6 is a schematic block diagram of a sample-computing system 400 with which the claimed subject matter can interact. The system 400 includes one or more client(s) 410. The client(s) 410 can be hardware and/or software (e.g., threads, processes, computing devices). The system 400 also includes one or more server(s) 420. The server(s) 420 can be hardware and/or software (e.g., threads, processes, computing devices). The server(s) 420 may be host to a plurality of virtual machines created as described herein.

One possible communication between a client 410 and a server 420 can be in the form of a data packet adapted to be transmitted between two or more computer processes. The system 400 includes a communication framework 440 that can be employed to facilitate communications between the client(s) 410 and the server(s) 420. The client(s) 410 are operably connected to one or more client data store(s) 450 that can be employed to store information local to the client(s) 410. The client data store(s) 450 do not have to be in the client(s) 410, but may be located remotely, such as in a cloud server. Similarly, the server(s) 420 are operably connected to one or more server data store(s) 430 that can be employed to store information local to the servers 420.

Figure 7:
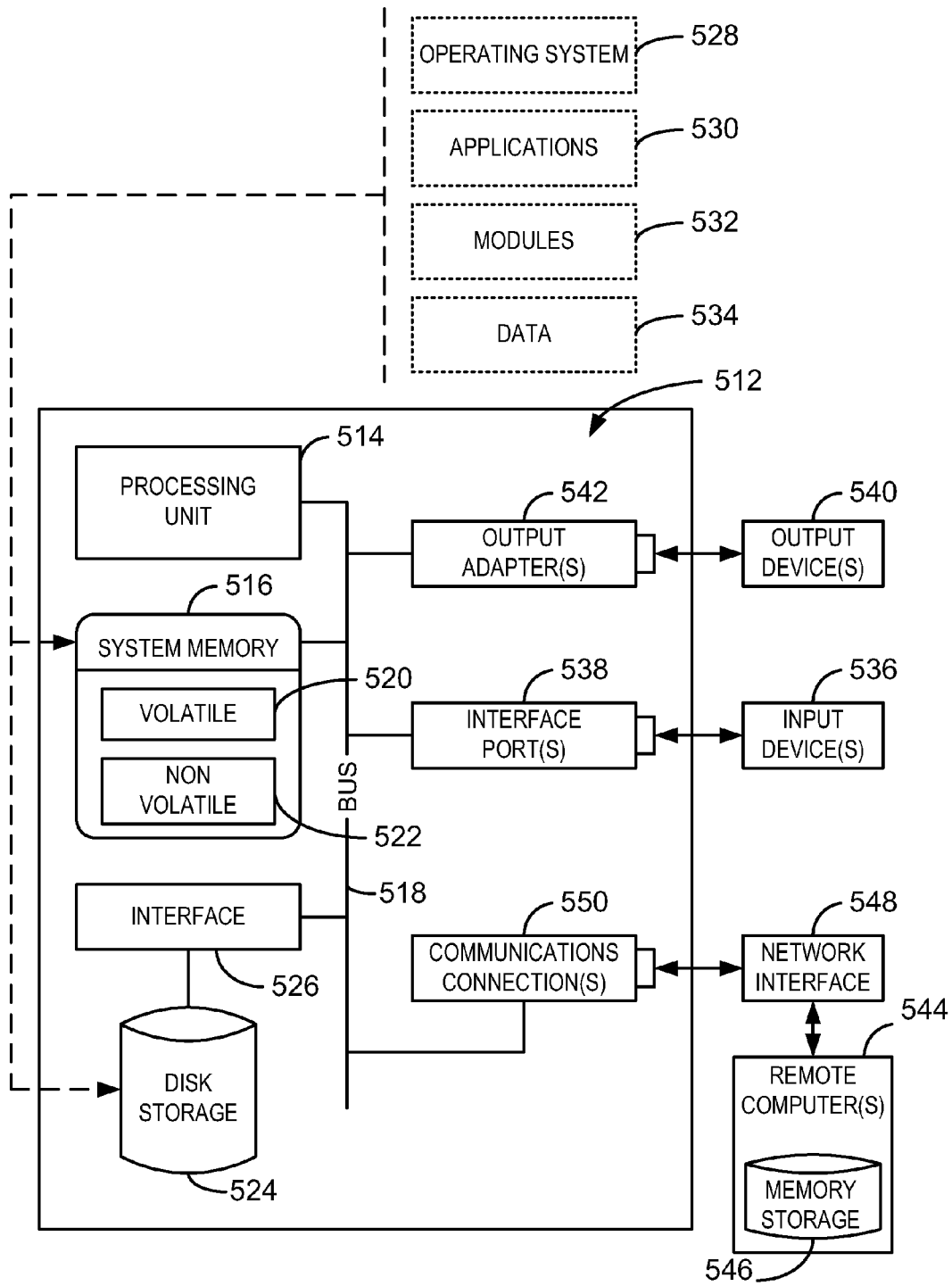
FIG. 7 is a block diagram of an exemplary operating environment that can be employed in accordance with the claimed subject matter.

With reference to FIG. 7, an exemplary environment 500 for implementing various aspects of the claimed subject matter includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures known to those of ordinary skill in the art.

The system memory 516 is non-transitory computer-readable media that includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), or flash memory.

Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 512 also includes other non-transitory computer-readable media, such as removable/non-removable, volatile/non-volatile computer storage media. FIG. 7 shows, for example a disk storage 524. Disk storage 524 includes, but is not limited to, devices like a magnetic disk drive, floppy disk drive, tape drive, Jaz drive, Zip drive, LS-100 drive, flash memory card, or memory stick.

In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 7 describes software that acts as an intermediary between users and the basic computer resources described in the suitable operating environment 500. Such software includes an operating system 528. Operating system 528, which can be stored on disk storage 524, acts to control and allocate resources of the computer system 512. Sharing of uniform pages representing an OS and application software on the disk storage 524 by virtual machines deployed as described herein may provide improved consolidation ratios in a virtual machine environment.

System applications 530 take advantage of the management of resources by operating system 528 through program modules 532 and program data 534 stored either in system memory 516 or on disk storage 524. It is to be appreciated that the claimed subject matter can be implemented with various operating systems or combinations of operating systems.

A user enters commands or information into the computer 512 through input device(s) 536. Input devices 536 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 536 connect to the processing unit 514 through the system bus 518 via interface port(s) 538. Interface port(s) 538 include, for example, a serial port, a parallel port, a game port, and a universal serial bus (USB).

Output device(s) 540 use some of the same type of ports as input device(s) 536. Thus, for example, a USB port may be used to provide input to the computer 512, and to output information from computer 512 to an output device 540.

Output adapter 542 is provided to illustrate that there are some output devices 540 like monitors, speakers, and printers, among other output devices 540, which are accessible via adapters. The output adapters 542 include, by way of illustration and not limitation, video and sound cards that provide a means of connection between the output device 540 and the system bus 518. It can be noted that other devices and/or systems of devices provide both input and output capabilities such as remote computer(s) 544.

The computer 512 can be a server hosting a search engine site in a networked environment using logical connections to one or more remote computers, such as remote computer(s) 544. The remote computer(s) 544 may be client systems configured with web browsers, PC applications, mobile phone applications, and the like, to allow users to access the social networking site, as discussed herein. The remote computer(s) 544 can be a personal computer, a server, a router, a network PC, a workstation, a microprocessor based appliance, a mobile phone, a peer device or other common network node and the like, and typically includes many or all of the elements described relative to the computer 512. For purposes of brevity, only a memory storage device 546 is illustrated with remote computer(s) 544. Remote computer(s) 544 is logically connected to the computer 512 through a network interface 548 and then physically connected via a communication connection 550.

Network interface 548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to the computer 512. The hardware/software for connection to the network interface 548 may include, for exemplary purposes only, internal and external technologies such as, mobile phone switches, modems including regular telephone grade modems, cable modems and DSL modems, ISDN adapters, and Ethernet cards.

An exemplary embodiment of the computer 512 may comprise a server hosting a search engine site. An exemplary processing unit 514 for the server may be a computing cluster comprising Intel® Xeon CPUs. The disk storage 524 may comprise an enterprise data storage system, for example, holding thousands of user pages. Exemplary embodiments of the subject innovation may move large volumes of data between fact and archive tables in a database. The subject innovation may move large volumes of data without impinging on the response-time constraints of the search engine site.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method of providing a template virtual machine, comprising:
creating, on a physical server, a template virtual machine comprising an image of an operating system and software running on the operating system, the template virtual machine being without machine-specific identifiers;
booting the template virtual machine into a virtual machine environment;
sharing uniform code pages among other virtual machines that are running the same template virtual machine wherein the uniform code pages are shared in advance to booting a template virtual machine into a service instance and not dynamically, and wherein sharing comprises mapping a guest physical address space associated with the template virtual machine to uniform system pages that already have the uniform code pages resident;

instantiating a state separated store on a differencing virtual hard disk to actively intercept system access to various configuration data stored in a registry and create state containers in the state separated store and to redirect to the state separated store during a service instance boot, each of the state containers including a precedence rank that indicates an order in which the state containers are to be layered in the state separated store;

updating machine-specific identifiers of the template virtual machine; and booting the template virtual machine with machine-specific identifiers, via the state separated store, into a service instance to perform a function determined by the software running on the operating system such that uniform code pages representing the operating system and software running on the operating system are shared among virtual machines in the virtual machine environment.

2. The method recited in claim 1, wherein the uniform code pages comprise identical physical memory pages.

3. The method recited in claim 1, wherein the function comprises a web hosting function.

4. The method recited in claim 1, comprising increasing a consolidation ratio in the virtual machine environment by booting another template virtual machine into the virtual machine environment.

5. The method recited in claim 1, comprising sharing configuration information between the template virtual machine and another template virtual machine having the same software running on the operating system.

6. The method recited in claim 1, comprising storing attributes that define the machine-specific identifiers in the state separated store.

7. The method recited in claim 6, comprising storing attributes corresponding to an application state of the software running on the operating system in the state separated store.

8. The method recited in claim 6, comprising modifying an attribute of the template virtual machine by accessing the state separated store either online or offline.

9. The method recited in claim 6, comprising creating a clone of the template virtual machine by copying the image of the operating system and the software running on the operating system and adding attributes corresponding to machine-specific identifiers.

10. The method of claim 1, comprising creating the differencing virtual hard disks across a physical server before the corresponding template virtual machine is booted into the service instance of the virtual machine environment.

11. The method of claim 1, wherein the uniform code pages are deployed in a homogeneous workload deployment.

12. The method of claim 1, further comprising providing security control through the state container.

13. A system for providing a template virtual machine, the system comprising:

a processing unit; and a system memory, wherein the system memory comprises code configured to direct the processing unit to:

create a template virtual machine comprising an image of an operating system and software running on the operating system, the template virtual machine being without machine-specific identifiers;

boot the template virtual machine into a virtual machine environment;

share uniform code pages among other virtual machines that are running the same template virtual machine wherein the uniform code pages are shared in advance to booting a template virtual machine into a service instance and not dynamically, and wherein sharing comprises mapping a guest physical address space associated with the template virtual machine to uniform system pages that already have the uniform code pages resident;

instantiate a state separated store on a differencing virtual hard disk to actively intercept system access to various configuration data stored in a registry and create state containers in the state separated store and to redirect to the state separated store during a service instance boot, each of the state containers including a precedence rank that indicates an order in which the state containers are to be layered in the state separated store;

update machine-specific identifiers of the template virtual machine; and boot the template virtual machine with machine-specific identifiers into a service instance to perform a function determined by the software running on the operating system such that uniform code pages representing the operating system and software running on the operating system are shared among virtual machines in the virtual machine environment.

14. The system recited in claim 13, wherein the uniform code pages comprise identical physical memory pages.

15. The system recited in claim 13, wherein a consolidation ratio in the virtual machine environment is increased by booting another template virtual machine into the virtual machine environment.

16. The system recited in claim 13, wherein configuration information is shared between the template virtual machine and a second template virtual machine having the same software running on the operating system.

17. The system recited in claim 13, comprising a state separated store that stores attributes that define the machine-specific identifiers.

18. The system recited in claim 17, wherein the state separated store stores attributes corresponding to an application state of the software running on the operating system.

19. The system recited in claim 17, wherein an attribute of the template virtual machine is modified by accessing the state separated store.

20. The system of claim 13, wherein the system memory comprises code configured to direct the processing unit to create the differencing virtual hard disks across a physical server before the corresponding template virtual machine is booted into the service instance of the virtual machine environment.

21. One or more computer-readable storage memory, comprising code configured to direct a processing unit to:

create a template virtual machine comprising an image of an operating system and software running on the operating system, the template virtual machine being without machine-specific identifiers;

boot the template virtual machine into a virtual machine environment;

share uniform code pages among other virtual machines that are running the same template virtual machine wherein the uniform code pages are shared in advance to booting a template virtual machine into a service instance and not dynamically, and wherein sharing comprises mapping a guest physical address space associated with the template virtual machine to uniform system pages that already have the uniform code pages resident;

instantiate a state separated store on a differencing virtual hard disk to actively intercept system access to various configuration data stored in a registry and create state containers in the state separated store and to redirect to the state separated store during a service instance boot, each of the state containers including a precedence rank that indicates an order in which the state containers are to be layered in the state separated store;

add machine-specific identifiers to the template virtual machine; and boot the template virtual machine with machine-specific identifiers into a service instance to perform a function determined by the software running on the operating system such that uniform code pages representing the operating system and software running on the operating system are shared among virtual machines in the virtual machine environment, the uniform code pages comprising identical physical memory pages, and the uniform code pages being identified in advance of booting the template virtual machine into the service instance of the virtual machine environment.

* * * * *